(12) United States Patent
Björklund et al.

(10) Patent No.: US 8,660,173 B2
(45) Date of Patent: Feb. 25, 2014

(54) VIDEO REFERENCE FRAME RETRIEVAL

(75) Inventors: Andreas Björklund, Lund (SE); Erik Persson, Lund (SE); Pontus Borg, Lund (SE); Mats Petter Wallander, Lund (SE)

(73) Assignee: ARM Limited, Cambridge (GB)

( * ) Notice: Subject to any disclaimer, the term of this patent is extended or adjusted under 35 U.S.C. 154(b) by 661 days.

(21) Appl. No.: 12/923,797

(22) Filed: Oct. 7, 2010

(65) Prior Publication Data

US 2011/0080959 A1    Apr. 7, 2011

(30) Foreign Application Priority Data

Oct. 7, 2009  (GB) .................................. 0917553.0

(51) Int. Cl.
*H04B 1/66*    (2006.01)

(52) U.S. Cl.
USPC .......................................................... 375/240

(58) Field of Classification Search
USPC .................................................... 375/240.25
See application file for complete search history.

(56) References Cited

U.S. PATENT DOCUMENTS

| | | | | |
|---|---|---|---|---|
| 5,758,120 | A * | 5/1998 | Kahle et al. .................... | 711/150 |
| 5,873,123 | A * | 2/1999 | Patel et al. ..................... | 711/202 |
| 6,118,724 | A * | 9/2000 | Higginbottom .......... | 365/230.05 |
| 6,510,506 | B2 * | 1/2003 | Nagapudi et al. ............. | 711/205 |
| 6,754,784 | B1 * | 6/2004 | North et al. .................... | 711/145 |
| 6,912,644 | B1 * | 6/2005 | O'Connor et al. ............ | 711/211 |
| 6,948,005 | B2 * | 9/2005 | Nishimaki et al. ................ | 710/5 |
| 7,093,099 | B2 * | 8/2006 | Bodas et al. ................... | 711/206 |
| 7,340,582 | B2 * | 3/2008 | Madukkarumukumana et al. ............. | 711/202 |
| 7,707,387 | B2 * | 4/2010 | Bittner, Jr. .................... | 712/201 |
| 7,782,087 | B2 * | 8/2010 | Vorbach .......................... | 326/38 |
| 2003/0200454 | A1 * | 10/2003 | Foster et al. ................... | 713/200 |
| 2004/0221128 | A1 * | 11/2004 | Beecroft et al. ............. | 711/203 |
| 2004/0221132 | A1 * | 11/2004 | Torkelsson et al. ........... | 711/210 |
| 2004/0247029 | A1 * | 12/2004 | Zhong et al. ............. | 375/240.16 |
| 2005/0047510 | A1 * | 3/2005 | Yamaguchi et al. ..... | 375/240.26 |
| 2005/0091652 | A1 * | 4/2005 | Ross et al. ......................... | 718/1 |
| 2005/0111548 | A1 * | 5/2005 | Lee et al. ................. | 375/240.12 |
| 2008/0104362 | A1 * | 5/2008 | Buros et al. .................... | 711/207 |
| 2008/0222663 | A1 * | 9/2008 | Carpenter et al. ............ | 719/328 |

(Continued)

FOREIGN PATENT DOCUMENTS

EP    1 553 523    7/2005

OTHER PUBLICATIONS

Motorola, MPC603e & EC603e RISC Microprocessors, Nov. 1997, Rev. 1, pp. 459.*

(Continued)

*Primary Examiner* — Sath V Perungavoor
*Assistant Examiner* — Peter D Le
(74) *Attorney, Agent, or Firm* — Nixon & Vanderhye P.C.

(57) ABSTRACT

A video data processing apparatus is provided comprising processing circuitry for performing video processing operations requiring access to video reference frames, and a memory management unit configured to translate virtual addresses into physical addresses. Translation circuitry is provided responsive to a memory access request for reference frame pixel data issued by the processing circuitry to perform a translation process on video reference frame information such that the set of input values for at least one hash function in the memory management unit comprises video reference frame identifier bits contained with the video reference frame information. This approach has been found to reduce the frequency of aliasing in the memory management unit when retrieving video reference frames.

22 Claims, 11 Drawing Sheets

(56) References Cited

U.S. PATENT DOCUMENTS

| | | | |
|---|---|---|---|
| 2009/0019265 A1* | 1/2009 | Correale et al. | 712/216 |
| 2009/0158003 A1* | 6/2009 | Sathaye et al. | 711/206 |
| 2009/0204785 A1* | 8/2009 | Yates et al. | 711/205 |
| 2011/0010483 A1* | 1/2011 | Liljeberg | 711/6 |
| 2012/0331308 A1* | 12/2012 | Fernandez Gutierrez | 713/190 |

OTHER PUBLICATIONS

Unknown, PowerPC Microprocessor Family: The Programming Environment, Rev. 0.1, pp. 122.*

Lemuet et al., Improving Load/Store Queues Usage in Scientific Computing, pp. 8.*

Search Report for GB0917553.0 dated Dec. 22, 2009.

Chen et al., Memory Performance Optimizations for Real-Time Software HDTV Decoding,*IEEE Conf. on Multimedia*, Aug. 2002, 4 pages.

Lu et al., "Rate and Decoding Power Constrained Video Coding Scheme for Mobile Multimedia Players", *IEEE*, 2004, pp. 2861-2864.

Chao et al., "A Motion Compensation System with a High Efficiency Reference Frame Pre-Fetch Scheme for QFHD H.264/AVC Decoding", *IEEE*, 2008, pp. 256-259.

* cited by examiner

VIDEO REFERENCE FRAME RETRIEVAL

This application claims priority to GB Application No. 0917553.0 filed 7 Oct. 2009, the entire contents of which are incorporated herein by reference.

BACKGROUND OF THE INVENTION

1. Field of the Invention

The present invention relates to a video data processing apparatus, and in particular relates to the access in memory of video reference frame data by such a video data processing apparatus.

2. Description of the Prior Art

Contemporary video encoding schemes such as H.264 (MPEG-4 AVC) allow high quality video data to be encoded with a significant degree of compression by means of advanced multi-picture inter-picture prediction techniques. These techniques, typically dividing a video frame into square-shaped groups of neighbouring pixels called macroblocks, involve comparing sub-blocks within the macroblocks from one video frame to portions of previously encoded frames, and then only storing the differences found.

In order for these comparisons to take place, it is necessary for the video data processing apparatus to have access not only to the frame of video data currently being encoded/decoded, but also to the "reference frame(s)" required according to the encoding scheme. These reference frames thus need to be buffered in the video data processing apparatus in order for the encoding/decoding to take place.

A notable feature of the H.264 encoding scheme is that multiple (up to 16) reference frames may be used, further enhancing the compression ratio that can be achieved. However, combined with the fact that video frame buffers for storing video reference frame data can be rather large (for example 3 MB for 1080p high definition video), this results in a requirement for significant quantities of video data to be efficiently moved around the video data processing apparatus.

It is also generally known in data processing apparatuses to arrange the storage of data required by the data processing apparatus in memory in a page mapped manner, wherein page tables stored in external memory provide a translation between the virtual addresses used by a program running in the data processing apparatus and the physical addresses of data in external memory. A memory management unit (MMU) is typically provided to administer these translations. Using page mapped memory through a MMU for a video data processing apparatus has the advantage of allowing its operation to be integrated with the memory management of the operating system and enables memory protection shielding from one application to another.

The MMU is normally arranged to have an internal storage unit in which a cached subset of all possible translations between virtual and physical addresses is stored. A typical example of such an internal storage unit is a translation lookaside buffer (TLB). When the MMU receives a memory access request from the data processing apparatus, it references its TLB to establish if an entry corresponding to that virtual address is currently stored therein. If it is, then the MMU translates the virtual address into the corresponding physical address using the TLB entry and the memory access request is carried out using that physical address. If however an entry corresponding to the requested virtual address is not stored in the TLB, then the MMU initiates a "page walk" process in which a page table stored in external memory is referenced to find the virtual address. A replacement entry for the TLB is retrieved from the page table (consisting of an indication of the virtual address to physical address translation and, typically, some other permission information). The physical address in memory is then accessed.

The process of virtual to physical address translation performed by a MMU is schematically illustrated in FIG. 1. The flow begins at step 100 and at step 110 a virtual address V is passed to the MMU. At step 120, the MMU evaluates a hash tag H(V) of the virtual address V. This hash tag H(V) is typically a portion of the virtual address which the MMU uses to index into the TLB. At step 130 the MMU indexes into the TLB using H(V). At step 140 it is determined whether there is a TLB hit for H(V), i.e. whether the entry in the TLB table indexed by H(V) corresponds to the virtual address V or not. If it does then the flow proceeds to step 150 and virtual address V is translated into its physical counterpart, and at step 160 that physical address in external memory is accessed. If however at step 140 there is not a TLB hit for H(V) then the flow proceeds to step 170 where the MMU performs a page walk process and reads the missing TLB entry from a page table in external memory into the TLB. The flow then continues to step 150 where the translation of V into its physical counterpart is carried out and to step 160 where that physical address and external memory is accessed (as before). The flow concludes at step 170.

The use of an MMU including a TLB can be advantageous, yet if TLB misses occur too frequently (in FIG. 1 the flow proceeding from step 140 via step 170 to step 150) then the MMU can stall and the process of memory access via the MMU can become very inefficient. In particular the phenomenon of "aliasing", wherein several virtual addresses map to the same entry of the TLB (which is inevitable for a limited size TLB), can result in frequent fetching of page table entries to populate that same TLB entry, significantly slowing down the operation of the MMU.

It is also known to store video reference frame data in a format which improves burst writing/reading efficiency to or from a memory device such as vertical striping (e.g. in sections of 8 horizontal pixels by 32 vertical pixels). The benefits of such a storage format are well known in the art, as discussed for example in "A Motion Compensation System with a High Efficiency Reference Frame Prefetch Scheme for QFHD H.264/AVC decoding), Ping Chao and Youn-Long Lin, IEEE International Symposium on Circuits and Systems, ISCAS 2008, pages 256-259.

It would be desirable to provide a technique which enabled the use of page mapped memory through a MMU for a video data processing apparatus which requires access to multiple large video reference frames, without frequent TLB misses occurring.

SUMMARY OF THE INVENTION

Viewed from a first aspect, the present invention provides a video data processing apparatus comprising: processing circuitry for performing video processing operations requiring access to video reference frames; translation circuitry, responsive to a memory access request for reference frame pixel data issued by said processing circuitry and specifying video reference frame information including video reference frame identifier bits, to perform a translation process on said video reference frame information; a memory management unit configured to translate a virtual address corresponding to said video reference frame information into a physical address indicating a storage location in external memory of said reference frame pixel data, said memory management unit having an internal storage unit having a plurality of entries wherein indications of corresponding virtual address portions and physical address portions are stored, said memory management unit being configured to index into at least one selected entry of said internal storage unit in dependence on at least one hash value derived from said virtual address using at least one hash function, wherein said memory management unit is configured, if said at least one selected entry does not correspond to said virtual address, to retrieve from a page table stored in said external memory a replacement entry corresponding to said virtual address, wherein said translation circuitry is configured to perform said translation process such that a set of input values for said at least one hash function comprises said video reference frame identifier bits.

The inventors of the present invention realised that the use of certain storage formats for video reference frame data, whilst perhaps improving burst efficiency, could result in very inefficient usage of an MMU's internal storage unit (e.g. a TLB cache) by virtue of that fact that so many TLB misses could occur that the MMU would essentially stall. Furthermore, the inventors of the present invention realised that this problem in a video data processing apparatus requiring access to video reference frames could be alleviated by providing translation circuitry which performs a translation process on video reference frame information provided by the processing circuitry in a memory access request. In particular the translation circuitry is configured to perform this translation process such that a set of input values for the at least one hash function used by the memory management unit comprises the video reference frame identifier bits. This realisation is based on the recognition that, when a video data processing apparatus is performing video processing operations requiring access to video reference frames, frequent aliasing in the TLB is likely to occur resulting in many TLB misses. This problem is likely to be particularly acute when using contemporary video encoding schemes such as H.264 which allows for multiple reference frames. Due to the fact that, when performing video processing operations on a macroblock of a current video frame, reference is likely to be made to macroblocks at the same geometric location in the video reference frames, there is likely to be significant repetition of, for example, coordinate information from one video reference frame to the next. However, by performing a translation process such that the set of input values for the at least one hash function comprises the video reference frame identifier bits, it is provided that when retrieving video reference frame data for two different video reference frames the addresses for those sets of data will index into different entries of the internal storage unit of the memory management unit, even if the same spatial coordinate information is requested for those two video reference frames.

The translation process could be carried out at a number of different points in the video data processing apparatus. In one embodiment the translation circuitry is virtual address generation circuitry, said virtual address generation circuitry being arranged to generate said virtual address from said video reference frame information. According to this arrangement the memory management unit is thus provided with a virtual address which is in a format such that when the at least one hash function is performed on the virtual address the video reference frame identifier bits are in the required parts of the virtual address such that the at least one hash function will be performed on values including the video reference frame identifier bits.

Such virtual address generation circuitry could take a number of forms, but in one embodiment said virtual address generation circuitry is comprised within memory burst access generation circuitry arranged to initiate memory access bursts in response to memory access requests issued by said processing circuitry. The use of memory burst access generation circuitry, such as a video direct memory access (VDMA) unit, is advantageous, because burst accesses provide a more efficient manner of accessing memory. Rather than simply allowing memory accesses to occur when the processing circuitry issues them, queuing these up to form bursts which access contiguous regions of physical memory makes more efficient use of memory resources.

In another embodiment said translation circuitry is embodied in hash function circuitry, said hash function circuitry being arranged to generate said at least one hash value according to said at least one hash function. According to this arrangement, the hash function circuitry of the memory management unit further comprises the translation circuitry such that when the at least one hash function is carried out, the video reference frame identifier bits are taken as at least some of the input values for the at least one hash function.

Advantageously, other information may also be comprised within the set of input values for the at least one hash function. In one embodiment, said video reference frame information comprises a chrominance information bit and the translation circuitry is configured to perform said translation process such that said set of input values for said at least one hash function comprises said chrominance information bit. Chrominance information is typically downscaled in encoded video data, meaning that the coordinates of information in a combined (Cb and Cr) chrominance (chroma) plane is then traversed at a different beat to that of a luminance plane, and thus if this 'chroma bit' (which selects between the luminance plane and the combined chroma plane) is included in the input values for the at least one hash function the above-mentioned aliasing effect can be reduced. In another embodiment said video reference frame information comprises an interlace field information bit and the translation circuitry is configured to perform said translation process such that said set of input values for said at least one hash function comprises said interlace field information bit. Using the interlace field information bit (which selects between the top and bottom fields of the interlaced frame) in the input values for the at least one hash function can further reduce the above-mentioned aliasing effect.

The above described operation of the translation process is of particular benefit when the video data processing apparatus is retrieving video reference frames from memory, but this translation process may not be desirable when other data is being retrieved. In one embodiment the translation circuitry is configured to alter the operation of said translation process in dependence on a type of data requested by said processing circuitry. This allows the data processing apparatus to more efficiently make use of the internal storage unit of the memory management unit in dependence on the type of data that is currently being requested by the processing circuitry. Alteration of the translation process will typically alter the format of the information stored in the internal storage unit of the memory management unit and correspondingly in the page table stored in external memory, and in one embodiment the video data processing apparatus is configured, in response to an alteration of operation of said translation process by said translation circuitry, to alter the page tables in external memory correspondingly. This may involve re-writing the page tables, or more simply may involve switching between alternative sets of page tables in memory.

It will be recognised that there are a variety of ways that the at least one hash function could derive the at least one hash value from the set of input values, but in one embodiment the set of input values itself is taken as said at least one hash value. In another embodiment the at least one hash value is computed as an algebraic function of said set of input values. It will be recognised that this algebraic function could be constructed in various ways, but in one embodiment said at least one hash value is computed by an exclusive-OR function applied to said set of data input values. This exclusive-OR function could be set up in various ways, but in one embodiment each video reference frame identifier bit is exclusive-OR-ed with a bit of said set of input values that is not a video reference frame identifier bit.

The translation circuitry could be provided at various points in the video data processing apparatus. In one embodiment said translation circuitry is integral with said memory management unit. In another embodiment said translation circuitry is integral with said processing circuitry. In yet another embodiment said translation circuitry is part of a video direct memory access unit.

A page table in external memory could be configured to store its entries in various ways, but in one embodiment said page table stores said entries in an ordering corresponding to a vertical stripe burst read order. Within each page table, it is advantageous if the entries are stored in an ordering which will allow reading to take place in an efficient burst, such as vertical striping.

In one embodiment said set of input values comprises more horizontal coordinate information than vertical coordinate information. This is advantageous since the inner loop in a decoding process typically runs horizontally and hence by having more horizontal than vertical coordinate information in the set of input values for the at least one hash function the usage distribution of entries of the internal storage unit will be more evenly spread.

Video reference frame information may be required to be retrieved from memory for various operations of a video data processing apparatus. In one embodiment said video processing operations are video decoding operations. In another embodiment said video processing operations are video encoding operations.

The memory management unit may be configured to index into a single selected entry of the internal storage unit in dependence on a single hash value derived from the virtual address using a single hash function, but in embodiments said memory management unit is configured to index into a first selected entry of said internal storage unit in dependence on a first hash value derived from said virtual address using a first hash function, and if said first selected entry does not correspond to said virtual address to index into a second selected entry of said internal storage unit in dependence on a second hash value derived from said virtual address using a second hash function. This provides greater flexibility in the manner in which the internal storage unit is employed and provides more ways in which a corresponding entry in the internal storage unit can be found, thus avoiding a fetch from external memory. If this second selected entry also does not correspond to the virtual address, the replacement entry can be allocated to one of the two entries selected, say, alternately or pseudo-randomly.

Viewed from a second aspect the present invention provides a method of performing video data processing comprising the steps of: performing video processing operations requiring access to video reference frames; issuing a memory access request for reference frame pixel data, said memory access request specifying video reference frame information including video reference frame identifier bits; performing a translation process on said video reference frame information; referencing a memory management unit to translate a virtual address into a physical address indicating a storage location in external memory of said reference frame pixel data, said memory management unit having an internal storage unit having a plurality of entries wherein indications of corresponding virtual address portions and physical address portions are stored, and indexing into at least one selected entry of said internal storage unit in dependence on at least one hash value derived from said virtual address using at least one hash function, wherein said memory management unit is configured, if said at least one selected entry does not correspond to said virtual address, to retrieve from a page table stored in said external memory a replacement entry corresponding to said virtual address, wherein said translation process is performed such that a set of input values for said at least one hash function comprises said video reference frame identifier bits.

The above, and other objects, features and advantages of this invention will be apparent from the following detailed description of illustrative embodiments which is to be read in connection with the accompanying drawings.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
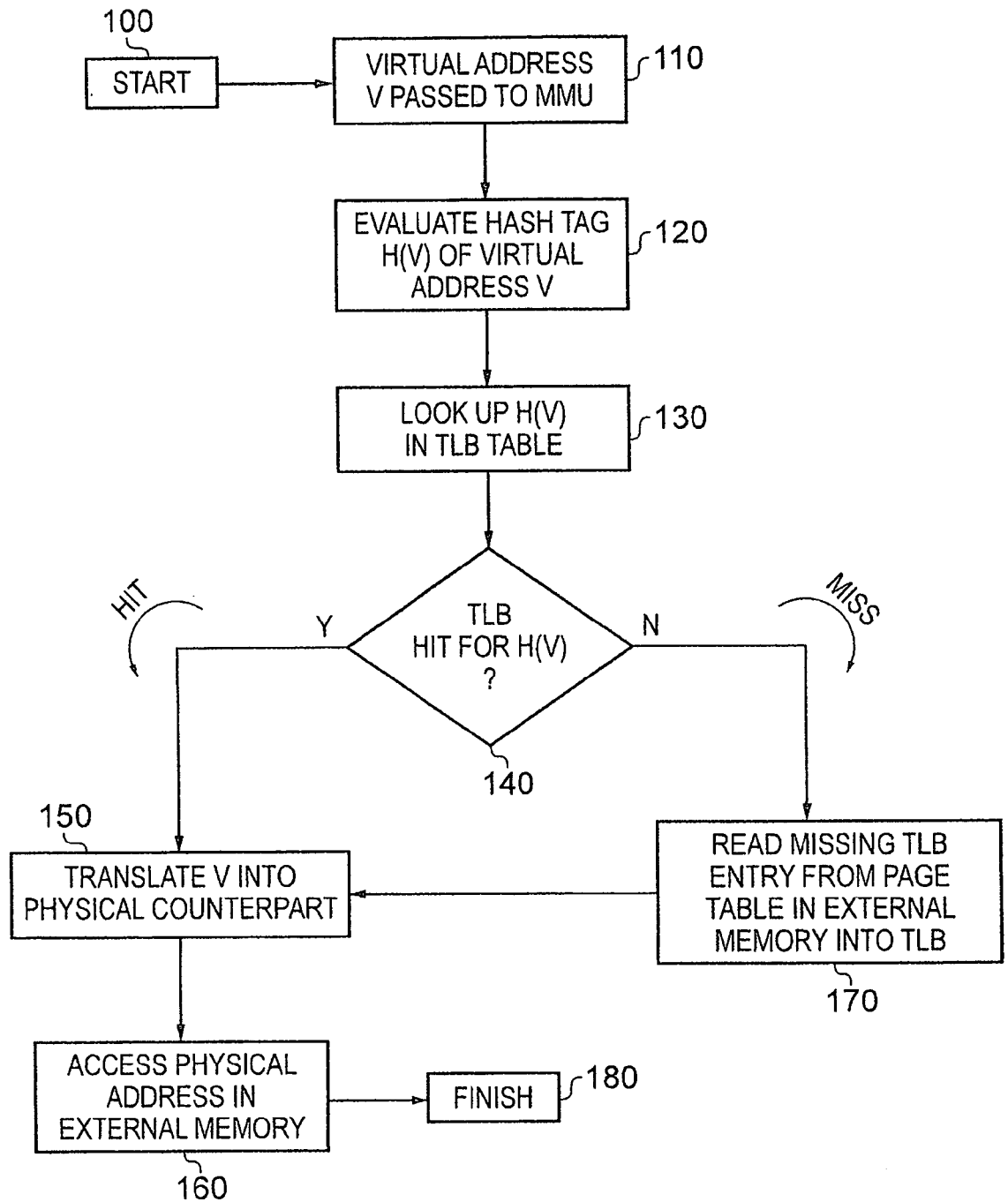
FIG. 1 schematically illustrates a series of steps taken by a memory management unit.
Figure 2:
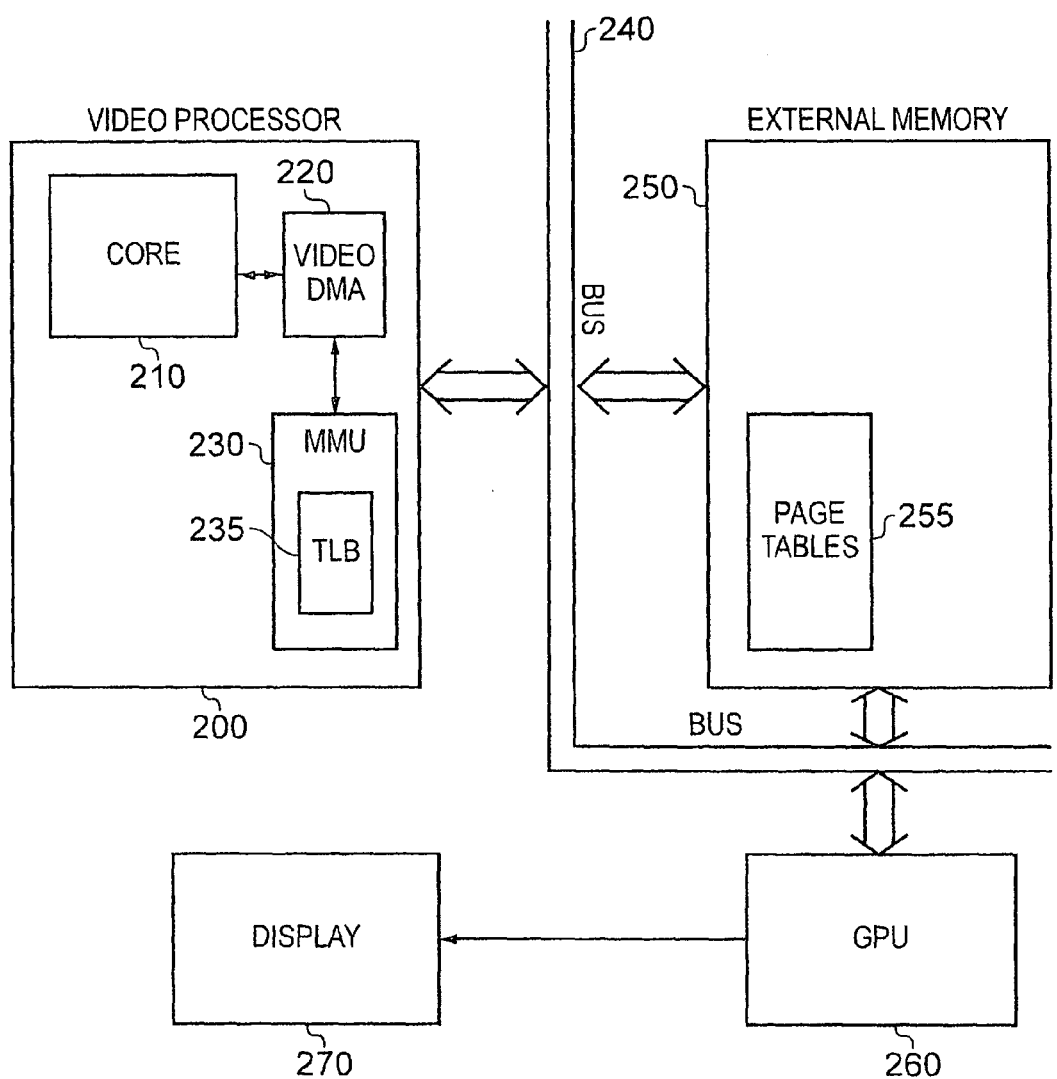
FIG. 2 schematically illustrates a system comprising a video data processing apparatus.

FIG. 2 schematically illustrates a system including a video data processing apparatus according to one embodiment of the present invention. Video processor 200 is arranged to perform video data processing operations and comprises a processor core 210, a video direct memory access (DMA) unit 220 and a memory management unit (MMU) 230. The MMU 230 has an internal storage unit 235, also known as a translation lookaside buffer (TLB). The video processor 200 communicates with the remainder of the system via bus 240. Also connected to bus 240 is external memory 250 and graphics processing unit (GPU) 260. GPU 260 is also connected to display unit 270.

In operation, core 210 issues memory access requests for data stored in external memory 250. These memory access requests are handled by video DMA 220 which interfaces between core 210 and MMU 230. In particular in the present context, the video DMA 220 takes a queue of memory copy requests from the core 210 and administers these data transfers. A request for an area of video data may be translated into a series of bursts of contiguous memory in physical memory by the video DMA 220, each burst being specified by a initial virtual address and a burst length. Video processor 200 uses a page-mapped memory system whereby virtual addresses are used within video processor 200 that are translated by MMU 230 into physical addresses which correspond to the actual storage location of data in external memory 250. The correspondence between virtual addresses and physical addresses is stored in page tables 255, which themselves are stored in external memory 250. In order to provide an efficient memory access system, MMU 230 caches a subset of the entries in the page tables 255 in its TLB 235. Hence when core 210 requests data from external memory 250, the virtual address received by MMU 230 is converted into a physical address at which that data can be accessed in external memory 250. If TLB 235 does not currently contain an entry corresponding to that virtual address, the page walk process described above is performed to retrieve an entry corresponding to that virtual address from page tables 255. The TLB 235 is then populated with that entry and the MMU 230 proceeds to carry out the memory access to that physical address.

Figure 8:
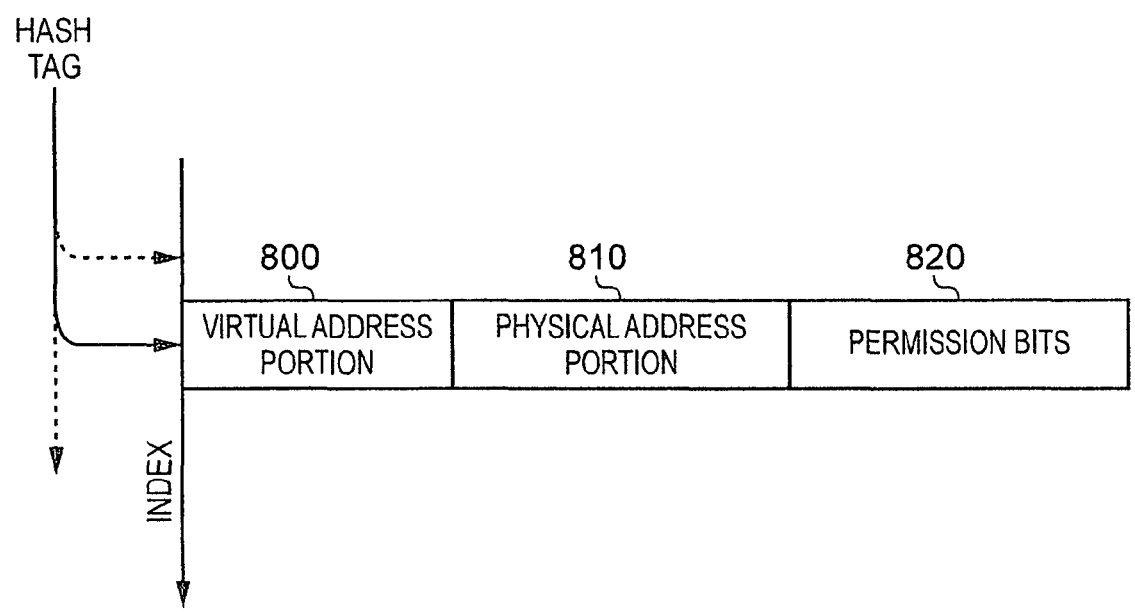
FIG. 8 schematically illustrates a hash tag being used to index into an entry of a TLB.

FIG. 8 schematically illustrates an entry of the TLB comprising virtual address portion 800, physical address portion 810 and permission bits 820. The calculated hash value (also known as a hash tag) derived from the virtual address is used to index into the TLB to select a particular entry. The virtual address portion 800 is then compared with the corresponding portion from the virtual address itself and if these correspond then the physical address portion 810 is used to retrieve the requested data (assuming that the permission bits 820 are set such that this address is allowed to be accessed by the current process).

Video processor 200 carries out video processing operations such as video encoding and video decoding. In particular video processor 200 is arranged to perform such decoding and encoding on video data which is encoded/decoded according to the H.264 codec standard. An important part of encoding according to the H.264 standard is the complex use of video reference frame data. This video reference frame data is stored in external memory 250 by the video processor 200 in video frame buffers which for video data encoded according to the H.264 codec can be rather large (for example approximately 3 MB for 1080p high definition video). Also, in the case of H.264 multiple frame buffers may be used further adding to the volume of data which is required to be handled.

Figure 3:
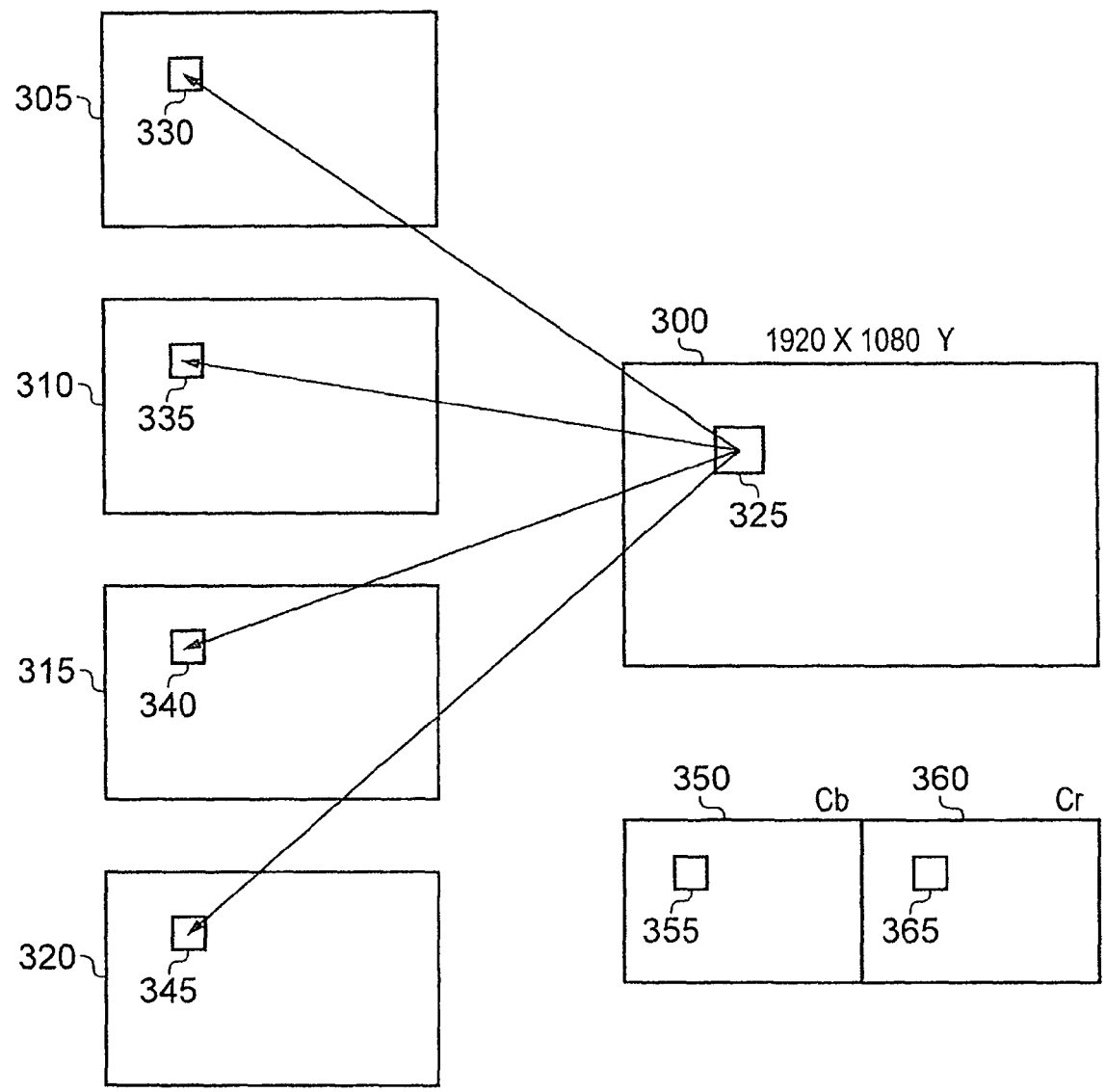
FIG. 3 schematically illustrates the correspondence between a current video frame being processed and four video reference frames.

The use of multiple video reference frames by a video data processing apparatus such as that illustrated in FIG. 2 is schematically illustrated in FIG. 3. In this example a video frame 300 is being decoded in which a macroblock 325 refers to macroblocks in four other video reference frames. In particular, in this example, the luminance (Y) information for this frame 300 contains a macroblock which refers to four video reference frames of luminance data 305, 310, 315 and 320. The illustrated macroblock 325 in frame 300 requires information from macroblocks 330, 335, 340 and 345 in reference frames 305, 310, 315 and 320 respectively. It is to be noted that these macroblocks are all at the same spatial coordinates within their respective frames. The inventors of the present invention realised that if this video data was addressed in normal sequential order (e.g. left to right and top to bottom) then this could result in a great deal of aliasing within the TLB 235 in MMU 230. This aliasing effect is explained in the following with reference to FIG. 4. Also illustrated in FIG. 3 are the corresponding chrominance frames (chroma frames) corresponding to luminance frame 300. These show Cb frame 350 and Cr frame 360, which are illustrated as half the size of luminance frame 300 since the chroma frames are downscaled by 50%. Each chroma frame is illustrated with the macroblocks 355 and 365 corresponding to luminance macroblock 325.

Figure 4:
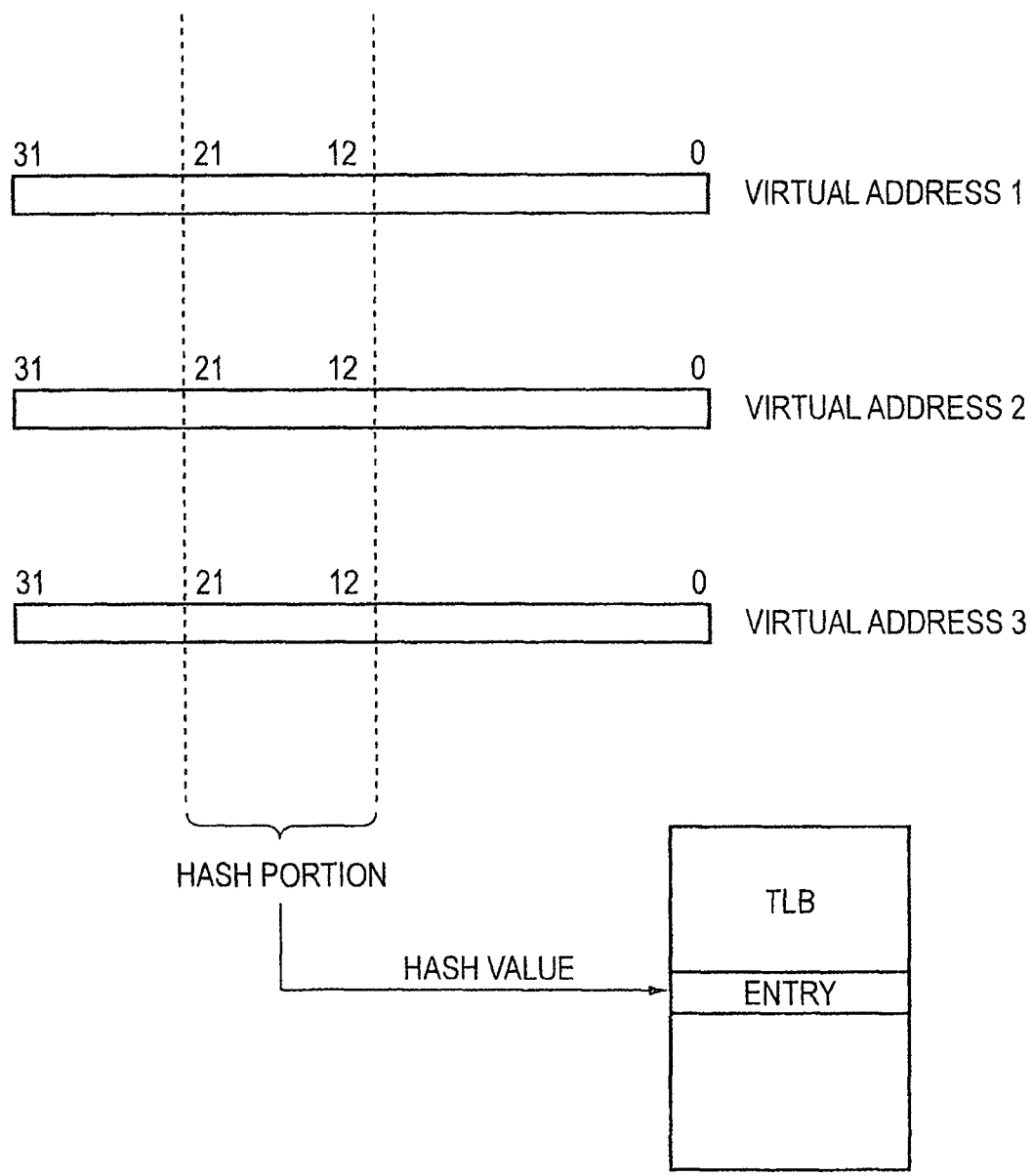
FIG. 4 schematically illustrates how aliasing may arise between TLB entries from three different virtual addresses.

The aforementioned TLB aliasing effect is now explained with reference to FIG. 4. The figure shows three 32-bit virtual addresses: virtual address 1, virtual address 2 and virtual address 3. Typically a portion of a virtual address received by the MMU will be used as the hash portion from which to generate a hash value that will be used to index into the TLB. It can be seen from FIG. 4 that if each of the three virtual addresses is formatted in such a way that the hash portion (taken here as bits 21-12 of the virtual address) only contains spatial coordinate information of the same format, then in the situation illustrated in FIG. 3 where a macroblock being decoded refers to macroblocks in other reference frames that are at the same spatial location then virtual addresses within each of these sets of pixel data will contain the same information in the hash portion illustrated in FIG. 4. As a consequence the same hash value will be used for each of the virtual addresses 1, 2 and 3 to index into the TLB and all three virtual addresses will have their corresponding entries stored in the same TLB entry. Thus if these three addresses were to come in sequence then even if the first virtual address were to be found in the TLB at its corresponding entry, the second and third would each cause a TLB miss for which reference to the page table in external memory would be necessary.

Figure 5:
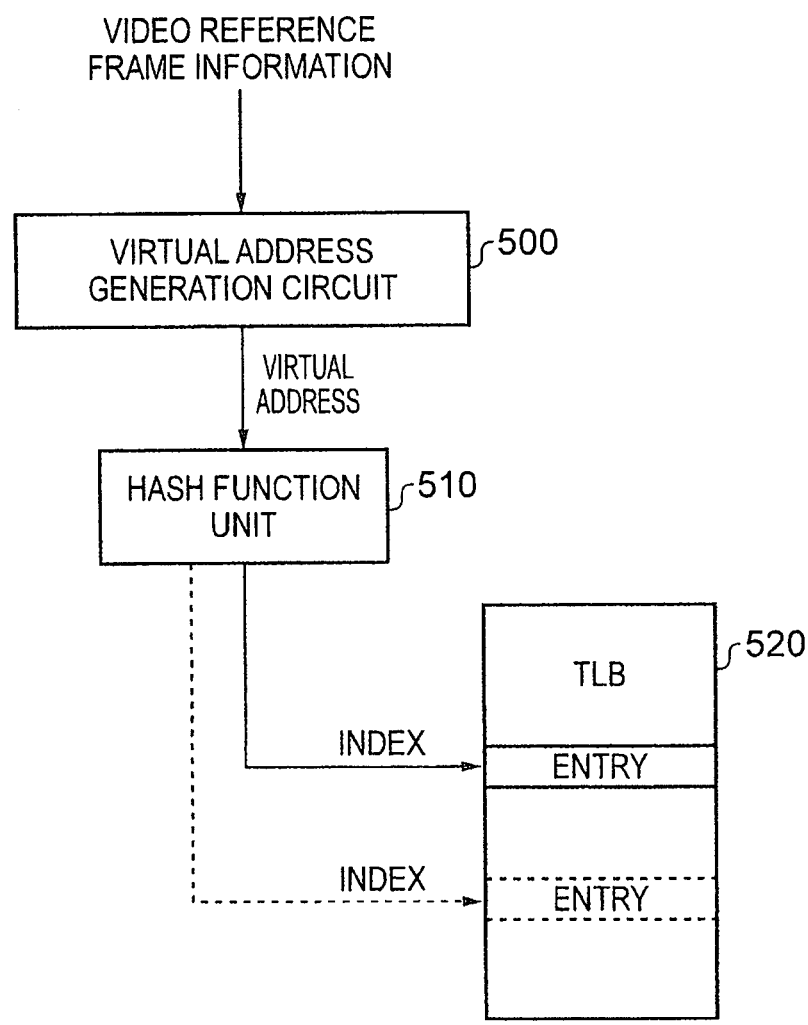
FIG. 5 schematically illustrates translation circuitry embodied as virtual address generation circuitry.
Figure 6:
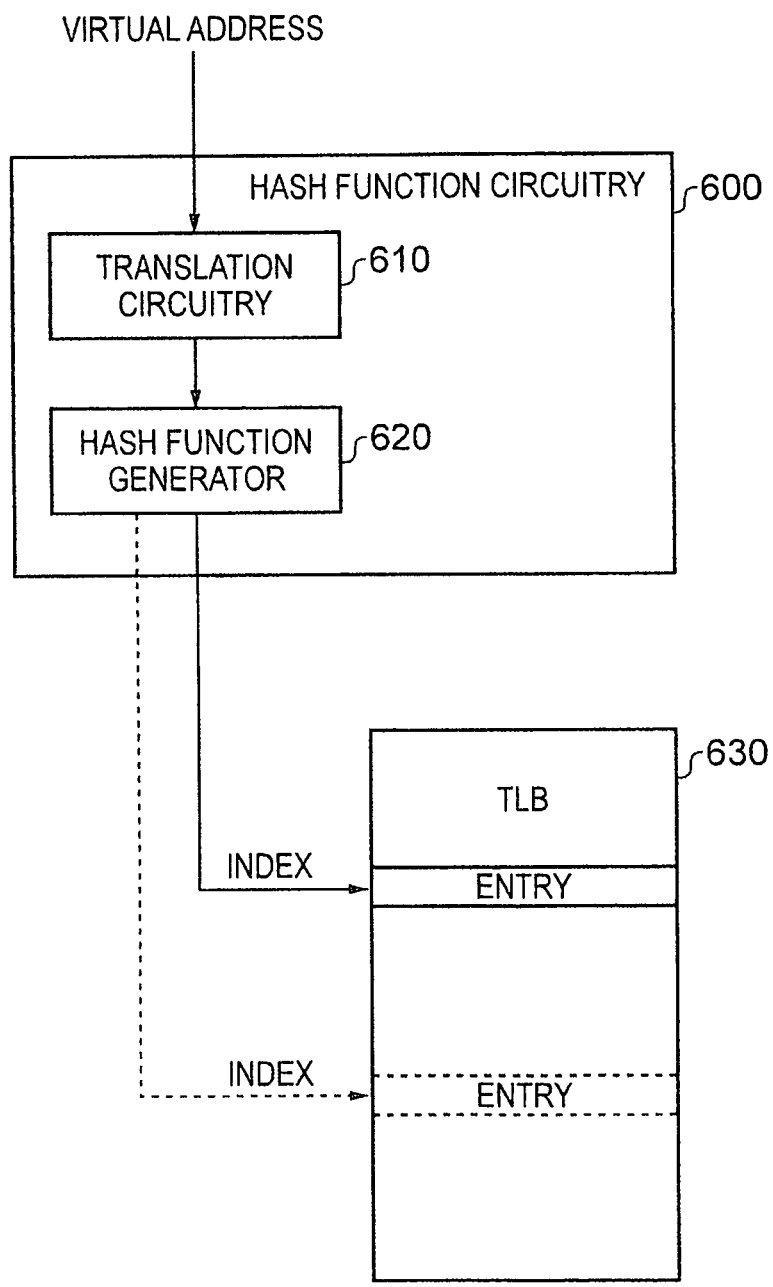
FIG. 6 schematically illustrates translation circuitry embodied within hash function circuitry.

The present invention addresses this problem by providing translation circuitry which is responsive to a memory access request for reference frame pixel data issued by the processor core to perform a translation process which ensures that the input values used by the hash function will differ. Two different methods of doing this are illustrated in FIGS. 5 and 6 respectively. In the embodiment schematically illustrated in FIG. 5 the translation circuitry is embodied as virtual address generation circuit 500 which takes video reference frame information and generates a virtual address, which then provides the input values to hash function unit 510. Hash function unit 510 generates the hash value (hash tag) which indexes into TLB 520. For example in one embodiment the virtual address generation circuit is provided within video DMA 220 (see FIG. 2) which receives video reference frame information from core 210 and generates a virtual address for passing to MMU 230. MMU 230 takes that virtual address and performs a hash function operation on it to derive the index for its TLB. Hence in this embodiment virtual address generation circuit 500 is found in video DMA 220 and hash unit 220 is found within MMU 230. TLB 520 corresponds to TLB 235. Note an alternative configuration (dashed line) is illustrated in FIG. 5, in which hash function unit 510 is configured to generate from the same virtual address two different hash values (hash tags) (by means of two distinct hash functions) which can index into TLB 520. This functionality can be provided to allow greater use of the TLB, whereby if the first indexed entry does not match, the second indexed entry can be checked.

The translation circuitry (virtual address generation circuit 500) is configured to alter the translation process it carries out in dependence on the type of data being requested by processor core 210. For example, in the illustrated embodiment the virtual address generation circuit 500 is configured to only perform the translation process when video reference frames are being accessed. When the translation process changes, the page tables accessed in external memory may be altered accordingly.

In another embodiment schematically illustrated in FIG. 6 the translation circuitry is embodied in hash function circuitry. In this embodiment the hash function circuitry is part of MMU 230 (as illustrated in FIG. 2). Thus the MMU receives a virtual address from video DMA 220 and internally performs the required translation before generating the index into its TLB. Hence hash function circuitry 600 forms an integral part of MMU 230 and within hash function circuitry 600 there is translation circuitry 610 and hash function generator 620. Note that TLB 630 corresponds to TLB 235. Note that FIG. 6 also illustrates the alternative configuration discussed with reference to FIG. 5, wherein two different hash values (hash tags) (by means of two distinct hash functions) can be generated (in this example from the same input from translation circuitry 610 into hash function generator 620) which can index into TLB 630.

Figure 7:
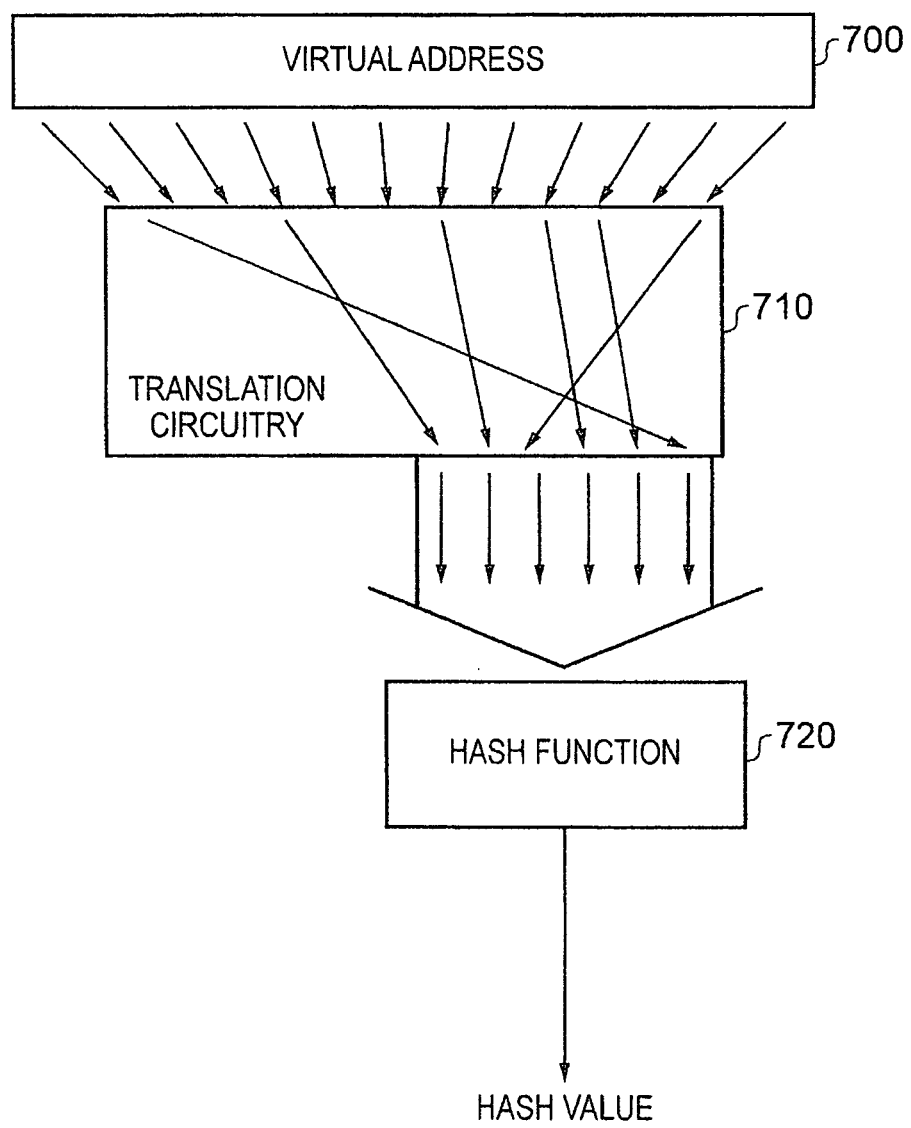
FIG. 7 schematically illustrates selected bits of a virtual address being used as input values for a hash function.

FIG. 7 schematically illustrates how the translation circuitry may be arranged to provide the inputs for a hash function on the basis of a virtual address. Virtual address 700 is for example a 32-bit address. The translation circuitry 710 is configured to pick out certain bits from the virtual address 700, in particular the video reference frame identifier bits, in order to provide the hash function 720 with its input values. The hash function then calculates the hash value according to a predetermined scheme.

Figure 9:
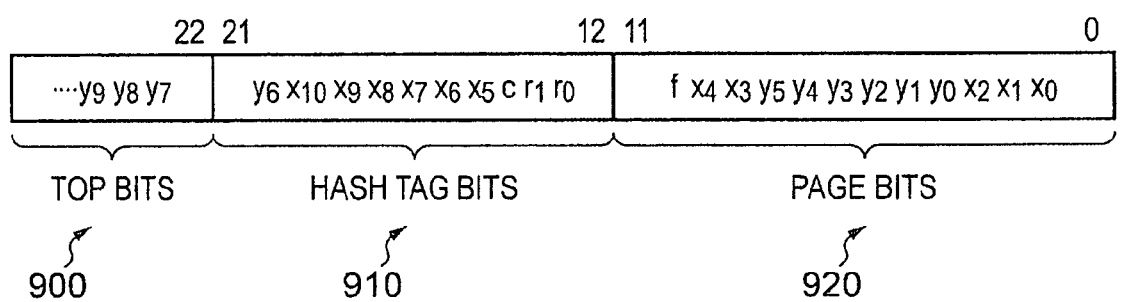
FIG. 9 schematically illustrates one configuration of a virtual address.

FIG. 9 schematically illustrates a 32-bit virtual address generated by a virtual address generation circuit such as that illustrated in FIG. 5. The virtual address consists of three portions namely top bits 900, hash tag bits 910 and page bits 920. The top bits 900 are bits 31-22 of the virtual address, the hash tag bits 910 are bits 21-12 of the virtual address and page bits 920 are the bits 11-0 of the virtual address. The virtual address illustrated in FIG. 9 corresponds to a system in which a frame is being decoded with four reference frames. The reference frames are selected via reference frame bits $r_0$ and $r_1$. Virtual address generation circuit 500 has arranged these reference frame number bits to appear in the hash tag bits 910 such that when switching between reference frames at the same spatial coordinates (x and y), the TLB aliasing described above will not occur. Also included in the virtual address are chrominance (chroma) information bit c and interlace field information bit f. The chroma information bit c is included in the hash tag bits, since the chroma information is downscaled and therefore the chroma plane is then traversed at a different beat to that of a luminance plane, and thus the inclusion of the chroma bit in the input values for the hash function helps to reduce aliasing. The interlace field information bit f forms part of the page bits, since the two interlace fields are typically handled together, and hence these can be stored in the same page in memory. In other embodiments the interlace field information bit may form part of the hash tag bits.

Figure 10A:
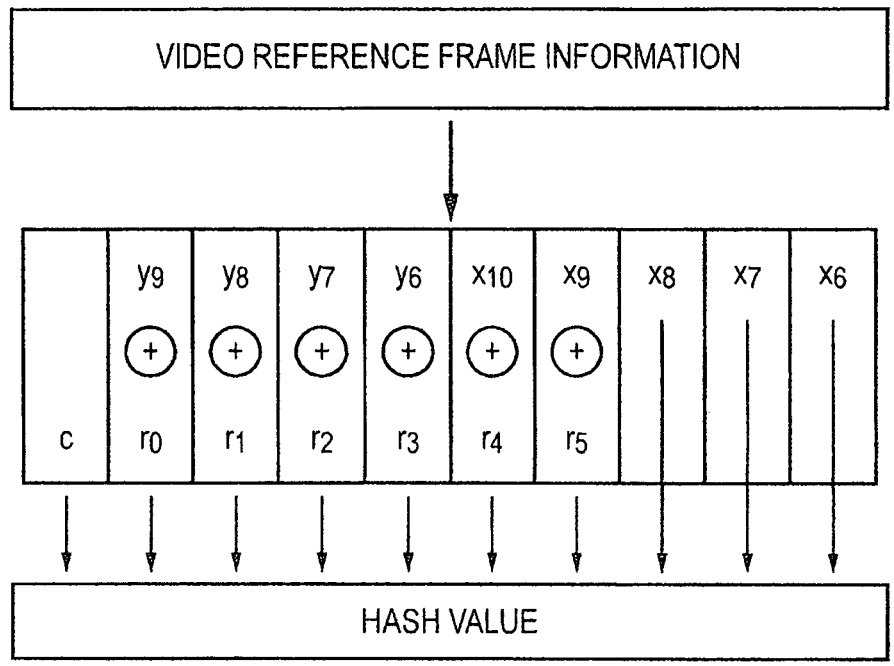
FIGS. 10A and 10B schematically illustrate two example ways of calculating a hash value.
Figure 10B:
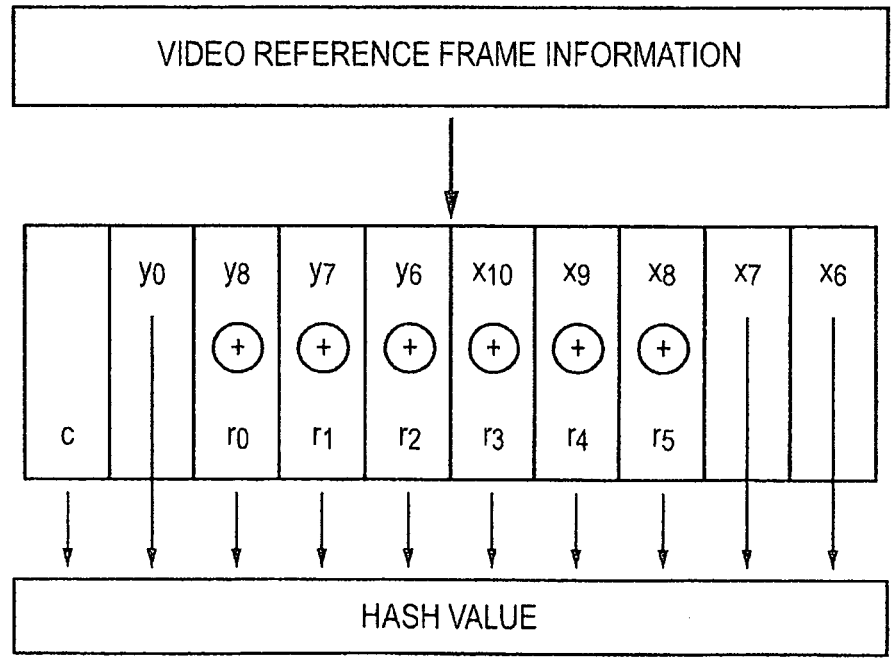

FIGS. 10A and 10B schematically illustrate two methods of calculating a 10-bit hash value. In FIG. 10A, a bit wise XOR operation is carried out between six pairs of video reference frame information bits, most notably the six video reference identifier bits ($R_0$ to $R_5$) are present in the hash value. An alternative arrangement is illustrated in FIG. 10B, in which interlacing is also included ($y_0$ being equivalent to the interlace field information bit f).

Figure 11:
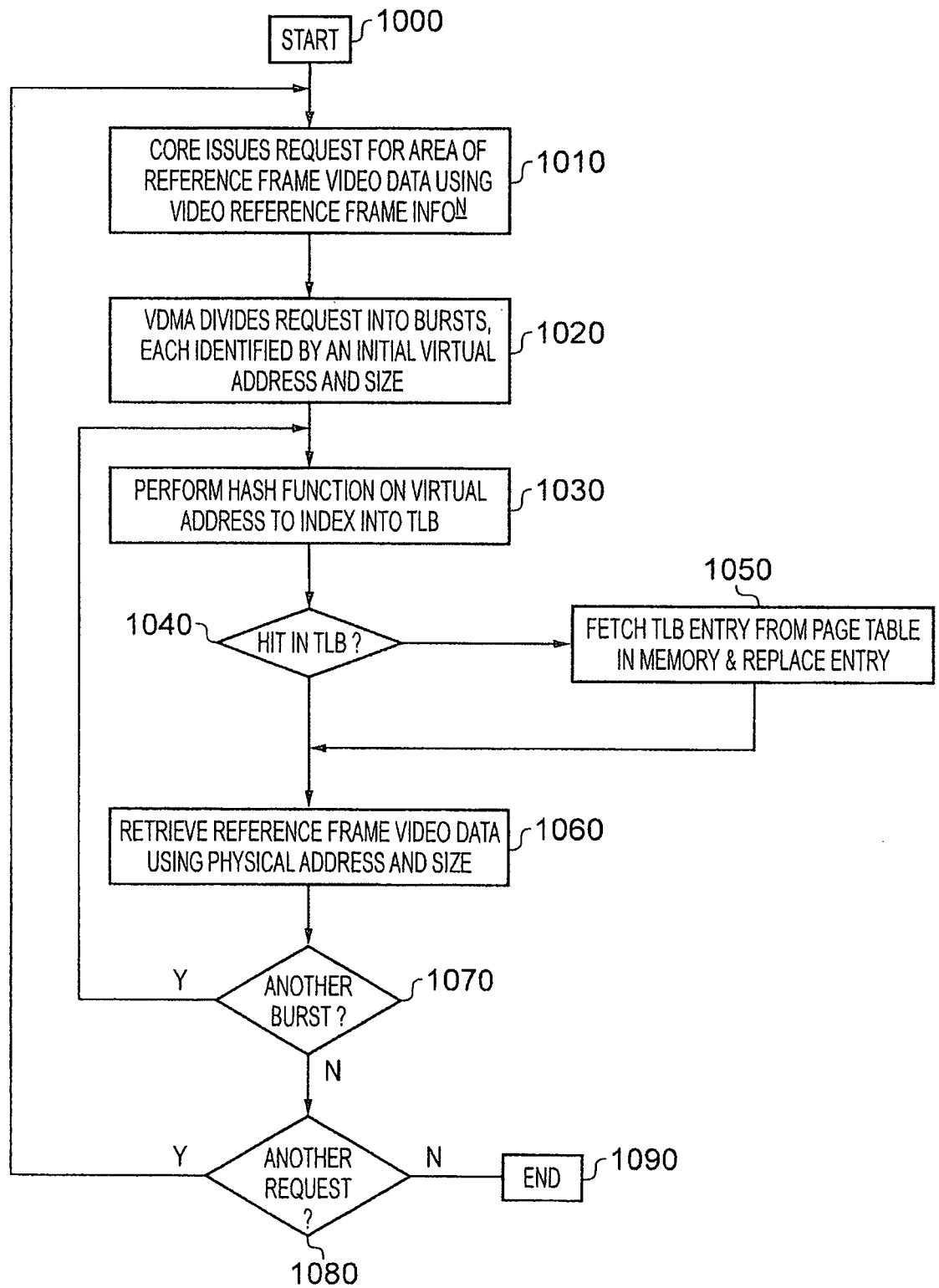
FIG. 11 schematically illustrates a series of steps taken by a video data processing apparatus.

FIG. 11 schematically illustrates a series of steps taking in a system such as that illustrated in FIG. 5, in which a video DMA creates formatted virtual addresses. The flow begins at step 1000 and proceeds to step 1010, where the processor core issues a request for an area of reference frame video data specified by video reference frame information (the parameters (x, y, r, f, c) and the size of the area). These memory copy tasks are handled by the VDMA at step 1020 by being divided into bursts of memory accesses, each identified by an initial virtual address and size. In this embodiment the VDMA acts as translation circuitry and generates the initial virtual address on the basis of the video reference frame information. The virtual addresses are generated such that at the following step 1030, where the MMU performs a hash function on the virtual address to index into its TLB, the video reference frame identifier bit(s) r is/are within the set of input values taken for the hash function. At step 1040 it is checked whether the virtual address corresponds to the virtual address portion stored in the entry identified by the index. If it does, i.e. there is a TLB hit, then the flow proceeds to step 1060, where the corresponding physical address portion stored in that entry is used to generate the physical address corresponding to the virtual address and the requested reference frame video data is retrieved using the physical address and the size of the burst. If it does not, i.e. there is a TLB miss, then the flow proceeds via step 1050, where a page walk process is carried out and a replacement TLB entry is retrieved from a page table in memory. The flow then proceeds to step 1060, as described above, and the reference frame video data is retrieved. At step 1070 it is determined if another burst is pending in the VDMA and if it is then the flow returns to step 1030 (described above). If another burst is not pending in the VDMA then at step 1080 it is determined whether another request is issued by the processor core. For another request, the flow returns to step 1010 (described above), otherwise the flow concludes at step 1090.

In an alternative embodiment, such as that illustrated in FIG. 6, the series of steps illustrated in FIG. 11 is carried out in a similar manner, with the exception that at step 1020 the VDMA does not act as translation circuitry (to rearrange the video reference frame identifier bit(s) in the virtual address). Instead the VDMA issues virtual addresses without concern as to the placement of the video reference frame identifier bit(s) and this rearrangement takes place upon entering the MMU, where the translation circuitry is embodied therein, as illustrated in FIG. 6.

According to the techniques of the present invention translation circuitry is provided in a video data processing apparatus to perform a translation process on video reference frame information such that the set of input values for a hash function in a memory management unit comprises video reference frame identifier bits and hence more efficient usage is made of the internal storage unit of the memory management unit. In particular the techniques of the present invention reduce the frequency of occurrence of misses in the internal storage unit of the memory management unit.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A video data processing apparatus comprising:
   processing circuitry configured to perform video processing operations requiring access to video reference frames;
   translation circuitry, responsive to a memory access request for reference frame pixel data issued by said processing circuitry, configured to perform a translation process on said video reference frame information, wherein said memory access request specifies video reference frame information, said video reference frame information including video reference frame identifier bits;

a memory management unit configured to translate a virtual address corresponding to said video reference frame information into a physical address indicating a storage location in external memory of said reference frame pixel data, said memory management unit having an internal storage unit having a plurality of entries wherein indications of corresponding virtual address portions and physical address portions are stored, said memory management unit configured to index into at least one selected entry of said internal storage unit in dependence on at least one hash value derived from said virtual address using at least one hash function, wherein said memory management unit is configured, if said at least one selected entry does not correspond to said virtual address, to retrieve from a page table stored in said external memory a replacement entry corresponding to said virtual address, wherein said translation circuitry is configured to perform said translation process such that a set of input values for said at least one hash function comprises said video reference frame identifier bits, said at least one hash function produces different hash values for two memory access requests for the same spatial coordinate information of two different video reference frames.

2. The video data processing apparatus as claimed in claim 1, wherein said translation circuitry is virtual address generation circuitry, said virtual address generation circuitry being arranged to generate said virtual address from said video reference frame information.

3. The video data processing apparatus as claimed in claim 2, wherein said virtual address generation circuitry is comprised within memory burst access generation circuitry arranged to initiate memory access bursts in response to memory access requests issued by said processing circuitry.

4. The video data processing apparatus as claimed in claim 1, wherein said translation circuitry is embodied in hash function circuitry, said hash function circuitry being arranged to generate said at least one hash value according to said at least one hash function.

5. The video data processing apparatus as claimed in claim 1, wherein said video reference frame information comprises a chrominance information bit and the translation circuitry is configured to perform said translation process such that said set of input values for said at least one hash function comprises said chrominance information bit.

6. The video data processing apparatus as claimed in claim 1, wherein said video reference frame information comprises an interlace field information bit and the translation circuitry is configured to perform said translation process such that said set of input values for said at least one hash function comprises said interlace field information bit.

7. The video data processing apparatus as claimed in claim 1, wherein said translation circuitry is configured to alter operation of said translation process in dependence on a type of data requested by said processing circuitry.

8. The video data processing apparatus as claimed in claim 7, wherein said video data processing apparatus is configured, in response to an alteration of operation of said translation process by said translation circuitry, to alter the page tables in external memory correspondingly.

9. The video data processing apparatus as claimed in claim 1, wherein said set of input values is taken as said at least one hash value.

10. The video data processing apparatus as claimed in claim 1, wherein said at least one hash value is computed as an algebraic function of said set of input values.

11. The video data processing apparatus as claimed in claim 10, wherein said at least one hash value is computed by an exclusive-OR function applied to said set of input values.

12. The video data processing apparatus as claimed in claim 11, wherein each video reference frame identifier bit is exclusive-OR-ed with a bit of said set of input values that is not a video reference frame identifier bit.

13. The video data processing apparatus as claimed in claim 1, wherein said translation circuitry is integral with said memory management unit.

14. The video data processing apparatus as claimed in claim 1, wherein said translation circuitry is integral with said processing circuitry.

15. The video data processing apparatus as claimed in claim 1, wherein said translation circuitry is part of a video direct memory access unit.

16. The video data processing apparatus as claimed in claim 1, wherein said page table stores said entries in an ordering corresponding to vertical stripe burst read order.

17. The video data processing apparatus as claimed in claim 1, wherein said set of input values comprises more horizontal coordinate information than vertical coordinate information.

18. The video data processing apparatus as claimed in claim 1, wherein said video processing operations are video decoding operations.

19. The video data processing apparatus as claimed in claim 1, wherein said video processing operations are video encoding operations.

20. The video data processing apparatus as claimed in claim 1, wherein said memory management unit is configured to index into a first selected entry of said internal storage unit in dependence on a first hash value derived from said virtual address using a first hash function, and if said first selected entry does not correspond to said virtual address to index into a second selected entry of said internal storage unit in dependence on a second hash value derived from said virtual address using a second hash function.

21. A method of performing video data processing comprising the steps of:

performing video processing operations requiring access to video reference frames;

issuing a memory access request for reference frame pixel data, said memory access request specifying video reference frame information, said video reference frame information including video reference frame identifier bits;

performing a translation process on said video reference frame information;

referencing a memory management unit to translate a virtual address into a physical address indicating a storage location in external memory of said reference frame pixel data, said memory management unit having an internal storage unit having a plurality of entries wherein indications of corresponding virtual address portions and physical address portions are stored, and indexing into at least one selected entry of said internal storage unit in dependence on at least one hash value derived from said virtual address using at least one hash function, wherein said memory management unit is configured, if said at least one selected entry does not correspond to said virtual address, to retrieve from a page table stored in said external memory a replacement entry corresponding to said virtual address, wherein said translation process is performed such that a set of input values for said at least one hash function comprises said video reference frame identifier bits, said at least one hash function produces different hash values for two memory access requests for the same spatial coordinate information of two different video reference frames.

22. A video data processing apparatus comprising:

processing means for performing video processing operations requiring access to video reference frames;

translation means, responsive to a memory access request for reference frame pixel data issued by said processing means, for performing a translation process on said video reference frame information, wherein said memory access request specifies video reference frame information, said video reference frame information including video reference frame identifier bits;

memory management means for translating a virtual address corresponding to said video reference frame information into a physical address indicating a storage location in external memory of said reference frame pixel data, said memory management means having an internal storage means having a plurality of entries wherein indications of corresponding virtual address portions and physical address portions are stored, said memory management means big configured to index into at least one selected entry of said internal storage means in dependence on at least one hash value derived from said virtual address using at least one hash function, wherein said memory management means is configured, if said at least one selected entry does not correspond to said virtual address, to retrieve from a page table stored in said external memory a replacement entry corresponding to said virtual address, wherein said translation means is configured to perform said translation process such that a set of input values for said at least one hash function comprises said video reference frame identifier bits, said at least one hash function produces different hash values for two memory access requests for the same coordinate information of two different video reference frames.

* * * * *